US010293280B2

(12) United States Patent
Vert et al.

(10) Patent No.: US 10,293,280 B2
(45) Date of Patent: May 21, 2019

(54) PUMPING SYSTEM

(71) Applicant: Weir Canada Inc., Mississauga (CA)

(72) Inventors: Peter Vert, Mississauga (CA); Richard Haight, Brampton (CA)

(73) Assignee: Weir Canada Inc., Mississauga, Ontario (CA)

( * ) Notice: Subject to any disclaimer, the term of this patent is extended or adjusted under 35 U.S.C. 154(b) by 0 days.

(21) Appl. No.: 15/936,761

(22) Filed: Mar. 27, 2018

(65) Prior Publication Data

US 2018/0214794 A1 Aug. 2, 2018

Related U.S. Application Data

(63) Continuation of application No. 14/342,741, filed as application No. PCT/CA2012/000819 on Sep. 5, 2012, now Pat. No. 9,937,444.

(Continued)

(30) Foreign Application Priority Data

Sep. 6, 2011 (CA) .................................... 2751791

(51) Int. Cl.
 *C02F 1/00* (2006.01)
 *F04D 13/06* (2006.01)
 (Continued)

(52) U.S. Cl.
 CPC .......... *B01D 21/0018* (2013.01); *B63B 21/50* (2013.01); *B63B 35/44* (2013.01);
 (Continued)

(58) Field of Classification Search
 CPC .. B63B 35/28; B63B 3/08; B63B 3/02; B63B 21/26; B63B 21/50; B63B 35/44;
 (Continued)

(56) References Cited

U.S. PATENT DOCUMENTS 444,007 A 1/1891 Monjeau
2,697,442 A * 12/1954 Anschutz ................. B67D 9/02
 114/263

(Continued)

OTHER PUBLICATIONS

International Search Report for PCT/CA2012/000819 dated Dec. 6, 2012 (5 pages).

(Continued)

*Primary Examiner* — Nathan C Zollinger
(74) *Attorney, Agent, or Firm* — Foley & Lardner LLP

(57) ABSTRACT

According to embodiments described in the specification, a pumping system for use in a tailings pond is provided. The pumping system comprises a pump support and at least one mooring element coupled to the pump support. The at least one mooring element has an extended position for fixing the pump support to a bed of the tailings pond, and a retracted position for permitting movement of the pump support towards a shore of the tailings pond. The at least one mooring element is configured for transitioning from the extended position to the retracted position when a distance from the shore to the pump support exceeds a threshold as a result of a change to tailings pond geometry, and for returning to the extended position following movement of the pump support to reduce the distance below the threshold.

20 Claims, 11 Drawing Sheets

Related U.S. Application Data

(60) Provisional application No. 61/531,300, filed on Sep. 6, 2011.

(51) Int. Cl.
*F04B 23/02* (2006.01)
*B63B 35/44* (2006.01)
*B63B 27/14* (2006.01)
*B63B 21/50* (2006.01)
*B63B 21/26* (2006.01)
*B01D 21/00* (2006.01)

(52) U.S. Cl.
CPC .............. *C02F 1/00* (2013.01); *F04B 23/025* (2013.01); *F04D 13/066* (2013.01); *B63B 21/26* (2013.01); *B63B 27/14* (2013.01); *B63B 2221/24* (2013.01); *C02F 2001/007* (2013.01)

(58) Field of Classification Search
CPC ..... B63B 27/14; B63B 2221/24; F04B 39/00; F04B 23/025; B01D 21/0018; B01D 17/02; F04D 13/066; C02F 2001/007; C02F 1/00; C02F 1/24; C02F 1/40; C02F 1/682; C02F 2103/007; C02F 2201/008; C02F 2201/001; E02B 3/064; E02B 15/04; E02B 15/046; E02B 15/08; E02B 15/0835; E02B 15/0857; E02B 17/00; E02B 2017/0056
USPC .............. 114/263; 37/345; 405/219; 417/61; 210/170.05, 170.09, 258, 416.1, 747.5, 210/747.6, 747.9
See application file for complete search history.

(56) References Cited

U.S. PATENT DOCUMENTS

| | | | |
|---|---|---|---|
| 3,552,424 A * | 1/1971 | Thompson | E02B 3/064 114/263 |
| 4,040,265 A | 8/1977 | Hellerman et al. | |
| 4,070,980 A | 1/1978 | Shorter, Jr. | |
| 4,735,164 A | 4/1988 | Burg | |
| 4,979,453 A | 12/1990 | Sloan et al. | |
| 5,288,174 A | 2/1994 | Kjersem et al. | |
| 5,479,869 A * | 1/1996 | Coudon | B63B 35/28 114/26 |
| 5,697,313 A * | 12/1997 | Horn | B63B 3/08 114/266 |
| 6,651,578 B1 | 11/2003 | Gorman | |
| 7,021,229 B2 * | 4/2006 | Mayers | B63B 3/08 114/26 |
| 9,068,697 B2 * | 6/2015 | Leneve | F17D 3/01 |
| 9,387,913 B1 * | 7/2016 | Dye | B63C 1/02 |
| 9,937,444 B2 * | 4/2018 | Vert | B63B 35/44 |
| 2015/0086389 A1 * | 3/2015 | Vert | B63B 35/44 417/61 |
| 2015/0362131 A1 * | 12/2015 | Haight | F17D 1/14 137/899.2 |

OTHER PUBLICATIONS

International Written Opinion for PCT/CA2012/000819 dated Dec. 5, 2012 (4 pages).
HyTran (http://www.hytran.com/floatingplatforms.htm, note dating of Aug. 20, 2008 on photos).

* cited by examiner

(12)  US 10,293,280 B2

PUMPING SYSTEM

CROSS REFERENCE TO RELATED APPLICATIONS

This application is a continuation U.S. patent application Ser. No. 14/342,741 filed Jun. 12, 2014, issuing as U.S. Pat. No. 9,937,444 on Apr. 10, 2018, which is a 371 filing of PCT/CA2012/000819 filed Sep. 5, 2012, which claims priority from Canadian Application for Patent No. 2,751,791 filed Sep. 6, 2011 and U.S. Provisional Patent Application No. 61/531,300, filed Sep. 6, 2011, the disclosures of which are incorporated by reference in their entirety.

TECHNICAL FIELD

The specification relates generally to pumping operations, and more particularly to a fixed but movable pumping system for use in such operations.

BACKGROUND TO THE DISCLOSURE

Tailings ponds, or impoundments, can be used in mining operations and other activities to collect refuse from the operations. Pump assemblies can be used to reclaim water from the tailings ponds for re-use or delivery to other operations.

Tailings ponds experience changes in water level as new tailings and reclaimed water, respectively, enter and leave the ponds. In addition, the physical geography of tailings ponds may vary as tailings build up along the shoreline. Further, tailings ponds can be exposed to severe weather in some locations, including wind, waves, and ice build-up. Thus, pump assemblies can be exposed to various conditions which may render management of the assemblies difficult and may reduce pump uptime. In addition, the assemblies may need to be relocated from time to time in response to the above conditions, which can further reduce uptime. Together, these difficulties can negatively affect the overall performance of the pump assembly.

SUMMARY

In a first aspect, embodiments are disclosed of a pumping system for use in a tailings pond, comprising: a pump support; and at least one mooring element coupled to the pump support, having an extended position for fixing the pump support to a tailings pond bed, and a retracted position for permitting movement of the pump support towards a shore of the tailings pond; the at least one mooring element configured for transitioning from the extended position to the retracted position when a distance from the shore to the pump support exceeds a predetermined threshold as a result of a change to tailings pond geometry, and for returning to the extended position following movement of the pump support to reduce the distance below the threshold.

In certain embodiments, at least one pump is mounted to the pump support.

In certain embodiments, the at least one mooring element is rigid.

In certain embodiments, the at least one mooring element comprises a spud slidably supported by a spud pocket coupled to the pump support.

In certain embodiments, the pump support comprises at least one pump barge releasably coupled to a header float, and wherein the at least one pump is mounted to the at least one pump barge.

In certain embodiments, the pump support comprises a plurality of pump barges releasably coupled to the header float and wherein the at least one pump comprises a plurality of pumps, each of the plurality of pumps being mounted to a respective pump barge.

In certain embodiments, the at least one mooring element is coupled to the header float.

In certain embodiments, at least one walkway is coupled to the header float for connecting the header float to the shore.

In certain embodiments, at least one walkway comprises a flexible floating walkway.

In certain embodiments, the at least one walkway comprises a pair of walkways coupled to the header float at opposing ends of the header float.

In certain embodiments, an onshore end of each of the pair of walkways is configured to connect to a towing apparatus.

In certain embodiments, an inshore area of the tailings pond is defined between the shore, the walkways and the header float.

In certain embodiments, the at least one pump barge is coupled to the header float within the inshore area.

In certain embodiments, at least one of the pair of walkways is configured for docking one of the at least one pump barges within the inshore area when the one of the at least one pump barges is disconnected from the header float.

In certain embodiments, the system further comprises at least one de-icing apparatus for keeping the inshore area free of ice.

In certain embodiments, the at least one de-icing apparatus comprises at least one submersible rotary de-icer connected to the at least one pump barge.

In certain embodiments, the system further comprises an electrical house supported on the header float for supplying power to the at least one pump barge.

In certain embodiments, the at least one mooring element comprises a plurality of spuds slidably supported by a respective plurality of spud pockets coupled to an offshore side of the header float.

In certain embodiments, the at least one pump barge comprises a pontoon body supporting the at least one pump, and a motor releasably operably coupled to the at least one pump.

In certain embodiments, the system further comprises at least one header pipe supported by the header float, wherein an outlet of the at least one pump is connected to the at least one header pipe.

In certain embodiments, the outlet is connected to the at least one header pipe via a discharge line releasably connected to the outlet and the at least one header pipe.

In certain embodiments, the system further comprises a moving apparatus for transitioning the at least one mooring element between the extended and retracted positions.

In certain embodiments, the at least one moving apparatus comprises at least one of a winch and a hydraulic cylinder.

In certain embodiments, the system further comprises an onshore crane for manipulating the at least one pump barge.

In a second aspect, embodiments are disclosed of a pumping system for use in a tailings pond, comprising:
    a header float having an inshore side and an offshore side, the inshore and offshore sides extending between opposing ends, the header float supporting at least one header pipe on an upper surface thereof;
    a pair of floating walkways coupled to the header float at the inshore side of the header float adjacent to each end, each floating walkway extending shoreward, at least a portion of each floating walkway configured for resting onshore;

a plurality of spuds slidably coupled to the header float in one of a raised position and a lowered position, the spuds configured to anchor the header float to a tailings pond floor in the lowered position; and a plurality of pump barges connected to the header float along the inshore side between the floating walkways.

In certain embodiments, the system of the second aspect may further comprises any one of the features of the system of the first aspect.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

The accompanying drawings facilitate an understanding of the various embodiments.

DETAILED DESCRIPTION OF THE EMBODIMENTS

Figure 1:
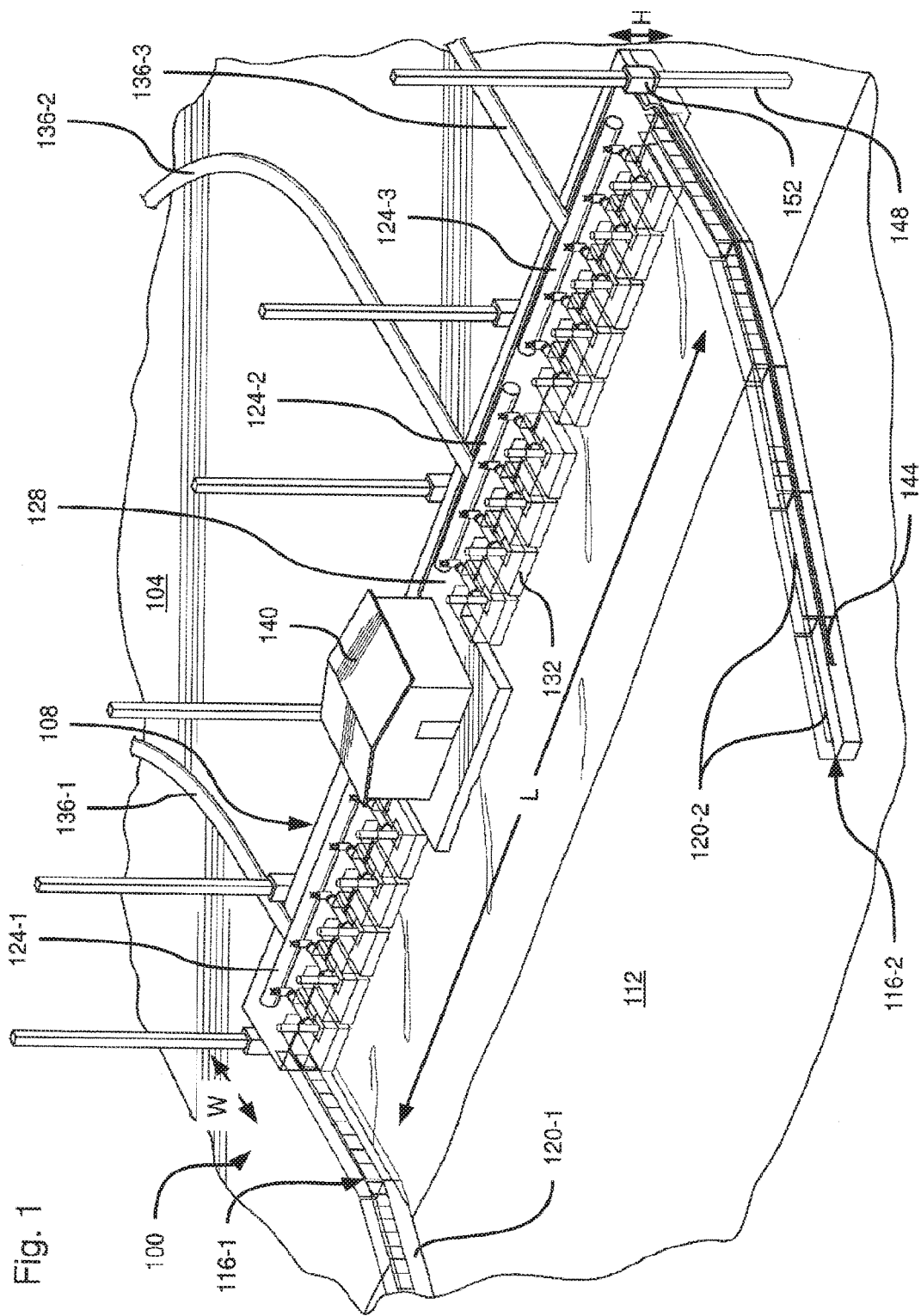
FIG. 1 depicts an isometric view of a fixed but movable pumping system, according to a non-limiting embodiment.

Referring to FIG. 1, a fixed but movable pumping system 100 for use in an impoundment, or tailings pond, 104 is shown. The tailings pond 104 can contain waste products from a variety of processes. For example, the tailings pond 104 can contain any one of, or any combination of, used process water, treated wastewater effluent, mineral flotation tailings, slurry and the like, resulting from mining operations and related activities. The pumping system 100 is used to reclaim water in the tailings pond 104 from which sediment has settled out sufficiently. The water reclaimed from the tailings pond 104 can be delivered, for example, to another impoundment for further sedimentation, for reuse in the mining operations, related activities or both, or any suitable combination of the above.

The pumping system 100 includes a pump support, to which at least one pump can be mounted. In the present example, the pump support includes a header float and at least one pump barge, as will be discussed in greater detail hereinbelow.

The pumping system 100 includes a header barge 108 (also referred to herein as header float 108), which is a substantially rigid floating structure which, when in use, floats on the tailings pond 104 in proximity to the shore region 112 of the tailings pond 104. The distance out from the shore 112 at which the header float 108 floats on the tailings pond 104 when it is in use is not particularly limited. In the example shown in FIG. 1, the distance from the shore 112 to the header float 108 is about 60 feet (18 meters), although it will become apparent herein that this distance can be varied.

The header float 108 can be constructed of any suitable material or combination of materials, including steel and other metals, plastics, composites (such as fibreglass) and the like. The header float 108, in the present example, is an elongate, substantially rectangular float having a length, measured parallel to the shoreline and indicated as "L" in FIG. 1, of about 240 feet (73 meters). The header float 108 has a width "W", measured perpendicularly to the length L, of about 20 feet (6 meters), which does not include the widened central portion of header float 108, to be described below. The header float 108 also has a height, "H", sufficient to provide about 2 feet (0.6 meters) of freeboard when it is deployed in the tailings pond 104. In the present example, the height H of header float 108 is about 7 feet (2.1 meters). The above dimensions, as well as the substantially rectangular shape shown in FIG. 1, are not particularly limiting, and the header float 108 can be provided in any shape and size which satisfies the structural features of a header float, as discussed in greater detail below.

The header float 108 is accessible from the shore 112 via at least one floating walkway 116. In the example shown in FIG. 1, the system 100 includes two walkways 116, labelled 116-1 and 116-2. At least a portion of each floating walkway 116 rests on the shore 112 when in use. A variety of configurations are possible for the floating walkways 116. In the present example, each floating walkway 116 is a flexible floating walkway and comprises a plurality of floating walkway sections 120, labelled 120-1 and 120-2 in FIG. 1. These sections 120 can be coupled end to end in any suitable manner. For example, the walkway sections 120 can be coupled end to end by pintle connections (also referred to as pintle hitches). In other examples, the walkway sections 120 can be coupled by cable or wire rope extending from one section 120 to another. Additionally, one or more marine buoys can be placed between connected sections 120 for shock absorption purposes. In the present example, the sections 120 are coupled to one another in such a manner as to allow the walkways 116 to articulate in order to accommodate an upward slope of the shore 112 region, extending away from the tailings pond 104. Such articulation can be achieved by the use of hinged connections between the sections 120. The sections 120 as shown in FIG. 1 are each about 40 feet (12 meters) in length. Thus, the walkway 116-2, which consists of five sections 120-2, has a total length of about 200 feet (61 meters) in the present example shown. It is contemplated, however, that the sections 120 can be provided in any other suitable length, or combination of lengths. In further embodiments the walkways 116 can comprise any suitable number of sections 120.

The header float 108 supports at least one header pipe 124 on an upper surface 128 of the header float 108. The term "upper" as used herein refers to the orientation of surface 128 when the header float 108 is in the installed position, floating on the tailings pond 104. Thus, the upper surface 128 is the surface of the header float 108 which is substantially parallel to the surface of tailings pond 104 and faces upwardly, away from tailings pond 104. In the present example, three header pipes 124, labelled 124-1, 124-2 and 124-3, are supported on the header float 108. Each header pipe 124 receives water from one or more pump barges 132 and transmits the received water to a respective discharge pipe 136. Thus, three discharge pipes 136-1, 136-2 and 136-3 are shown, each one corresponding respectively to a header pipe 124-1, 124-2 and 124-3. The discharge pipes 136 carry the water downstream for further processing, as will be discussed below.

A plurality of pump barges 132 are coupled to header float 108. Each pump barge 132 comprises a discharge line, to be discussed below in greater detail, which is connected to one of the header pipes 124. In some examples, each pump barge 132 can be connected to a header float 108 solely by way of the connection between the pump barge 132 and the respective header pipe 124. In other examples, an additional coupling can be provided between each pump barge 132 and header float 108 for further stability. In the present example, fourteen pump barges 132 are provided (not all of these are labelled, to maintain legibility in FIG. 1). Specifically, five pump barges 132 are connected to header pipe 124-1, four additional pump barges 132 are connected to the header pipe 124-2, and five further pump barges 132 are connected to the header pipe 124-3. The example arrangement shown in FIG. 1 is not particularly limiting, and a wide variety of arrangements of pump barges 132 and header pipes 124 can be implemented, depending on the pumping requirements to be satisfied by the system 100. For example, if the discharge pipe 136-2 required a greater flow rate, the header pipe 124-2 could be modified to accommodate a larger number of pump barges 132.

The header float 108 can also support, on the upper surface 128, an electrical house 140. The electrical house 140 is supplied with electrical power from onshore facilities (not shown) by way of cabling 144 which is carried to the header float 108 on a walkway 116. In the example shown in FIG. 1, the walkway 116-2 includes a cable tray for the cabling 144. In other examples, it is contemplated that more than one walkway can be used to carry the cabling 144. The electrical house 140 contains the required facilities to supply the pump barges 132 with electrical power. The electrical house 140 can also contain control mechanisms for controlling the operation (e.g. flow rate) of each pump individually. In other examples, such mechanisms can be located on the individual pump barges 132.

The pumping system 100 also includes at least one mooring element coupled to the pump support. In the present example, the at least one mooring element is coupled to header float 108. The at least one mooring element can be a rigid mooring element, such as a spud, as will be discussed in greater detail below.

Also shown in FIG. 1 there is depicted a plurality of spuds 148. Each spud 148 is slidably supported within a spud pocket 152 coupled to the header float 108, such that when header float 108 is in use (that is, deployed in tailings pond 104), the spuds 148 are slidable between retracted (also referred to herein as "raised") and extended (also referred to herein as "lowered") positions, with the lowered positions resulting in the spuds 148 being embedded within, or at least abutted against, the bottom of the pond 104. In the raised position, the spuds 148 do not engage the bottom of the pond 104, and thus allow the header float 108 to be relocated within pond 104. The spud pockets 152 are coupled to the header float 108 along one or more sides of said header float 108. The spud pockets 152 can be coupled to header float 108 in fixed permanent positions, for example by welding or other permanent fastening, or can be temporarily fixed in position along the sides of the header float 108. For example, the spud pockets 152 can themselves be slidable along a rail (not shown) extending around the sides of header float 108.

In the example shown in FIG. 1, six spuds 148 are provided with the header float 108. In the present example, the use of between four and six spuds 148 is contemplated. However, any suitable number of spuds may be provided, to accommodate various shapes and sizes of header float 108 and various operating environments (e.g. wind and wave loading in the tailings pond 104). The operation of the spuds 148 will be discussed in greater detail below.

Figure 2:
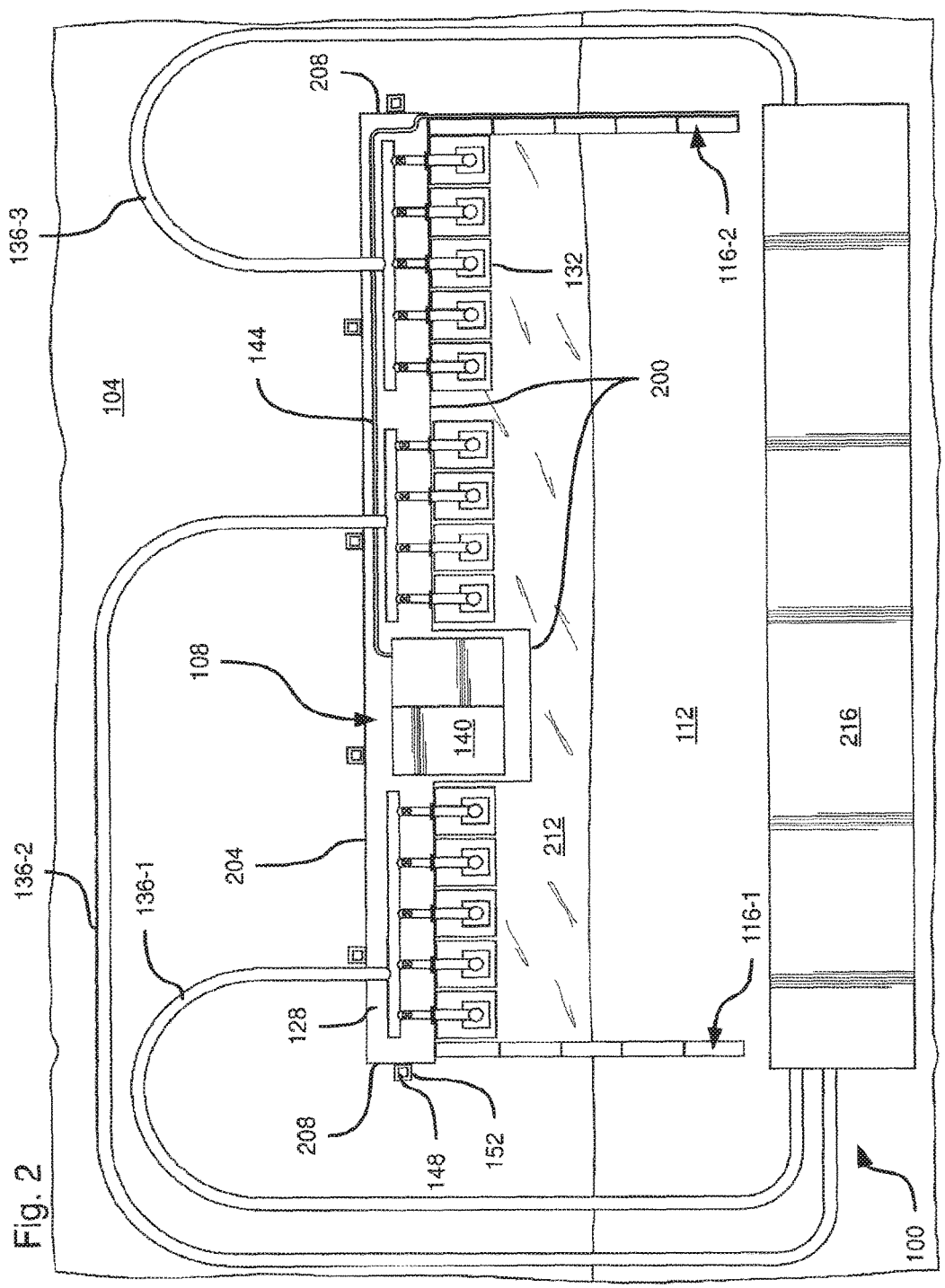
FIG. 2 depicts an overhead plan view of the system of FIG. 1, according to a non-limiting embodiment.

Turning to FIG. 2, an overhead plan view of the pumping system 100 is shown. From FIG. 2 it can be seen that the header float 108 has an inshore side 200, an offshore side 204, and opposing ends 208. The terms "inshore" and "offshore" as used herein refer to the orientation of the header float 108 when deployed in the tailings pond 104. Thus, the inshore side 200 is the side of the header float 108 which is closest to the shore 112 when the header float 108 is deployed in the pond 104. The offshore side 204 is the side of the header float 108 furthest from the shore 112 when the header float 108 is deployed in the pond 104. While the inshore side 200 and the offshore side 204 are substantially parallel to one another and to the shore 112 in the present example, they need not be substantially parallel to one another or to the shore 112, so long as the inshore side 200 generally faces the shore 112 when the header float 108 is deployed in the pond 104. In the present example, the ends 208 are substantially perpendicular to the sides 200, 204, though this arrangement is also not strictly necessary.

The two walkways 116-1 and 116-2 are coupled to the header float 108 along the inshore side 200 adjacent to the ends 208. That is, the walkway 116-1 is coupled adjacent to one end 208, while the other walkway 116-2 is coupled adjacent to the opposite end 208. The nature of the coupling between the walkways 116 and the header float 108 is not particularly limited. For example, the walkways may be coupled to the upper surface 128 at the side 200, or they may be coupled to a side surface (not visible in FIG. 2) perpendicular to the upper surface 128, or to both of the above-mentioned surfaces. The walkways 116 need not be anchored or otherwise connected to any structures on the shore 112, as is shown in FIG. 2. Rather, the portions of the walkways 116 which extend onto the shore 112 can rest on the shore 112 but remain movable, as will be discussed in greater detail below.

As shown in FIG. 2, when the header float 108 is deployed in the pond 104 and the walkways 116 are coupled to the header float 108, a substantially enclosed inshore space 212 within pond 104 is defined by the header float 108, the walkways 116 (the portions of which lie between the header float 108 and the shore 112, it will be recalled, float in tailings pond 104) and the shore 112. The pump barges 132 are coupled to the header float 108 within the inshore space 212. In other words, each one of the pump barges 132 is coupled to the header float 108 along the inshore side 200 and between the walkways 116. As with the walkways 116, the particular manner of coupling the pump barges 132 to the header float 108 is not particularly limited.

Cabling 144 is also shown in FIG. 2 travelling along the walkway 116-2 onto the header float 108 and to the electrical house 140. Additional cabling (not shown) is provided between the electrical house 140 and each pump barge 132 for supplying power to the pump barges 132. It is contemplated that the cabling 144 originates from onshore facilities (not shown) before travelling onto the walkway 116-2 towards the header float 108.

Also shown in FIG. 2 is the positioning of spuds 148 and the spud pockets 152. Each of the six provided spuds 148 is mounted along the offshore side 204 and the ends 208 of the header float 108. It is contemplated, however, that other arrangements can also be implemented. For example, one or more spuds 148 (and corresponding spud pockets 152) can be coupled to the header float 108 along the inshore side 200 instead of the offshore side 204 or the ends 208.

Figure 5:
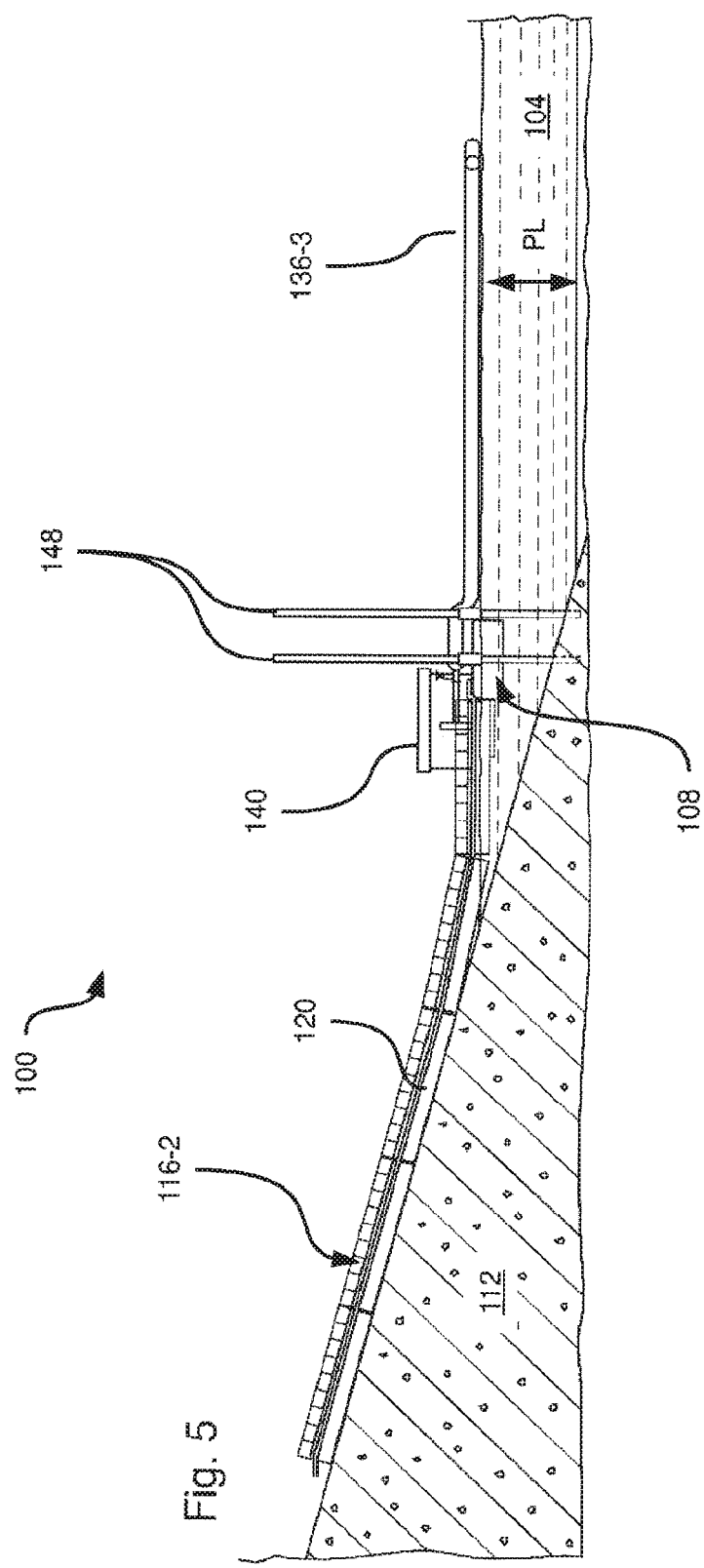
FIG. 5 depicts the system of FIG. 1 in an installed position, according to a non-limiting embodiment.

The discharge pipes 136 each direct water from the pump barges 132 to a transfer station 216 on the shore 112. The discharge pipes 136 can be configured to float on the surface of the tailings pond 104 as they travel from the header float 108 to the shore 112 (as shown in FIG. 5, to be discussed further below). In other examples, the discharge pipes 136 can travel underneath the surface of the tailings pond 104, such as along the bottom of the tailings pond 104. From the transfer station 216, water can then be provided to further downstream facilities. In some examples, the transfer station 216 can be omitted and the discharge pipes 136 can travel directly to the various downstream facilities to which water from the tailings pond 104 is to be delivered.

Figure 3:
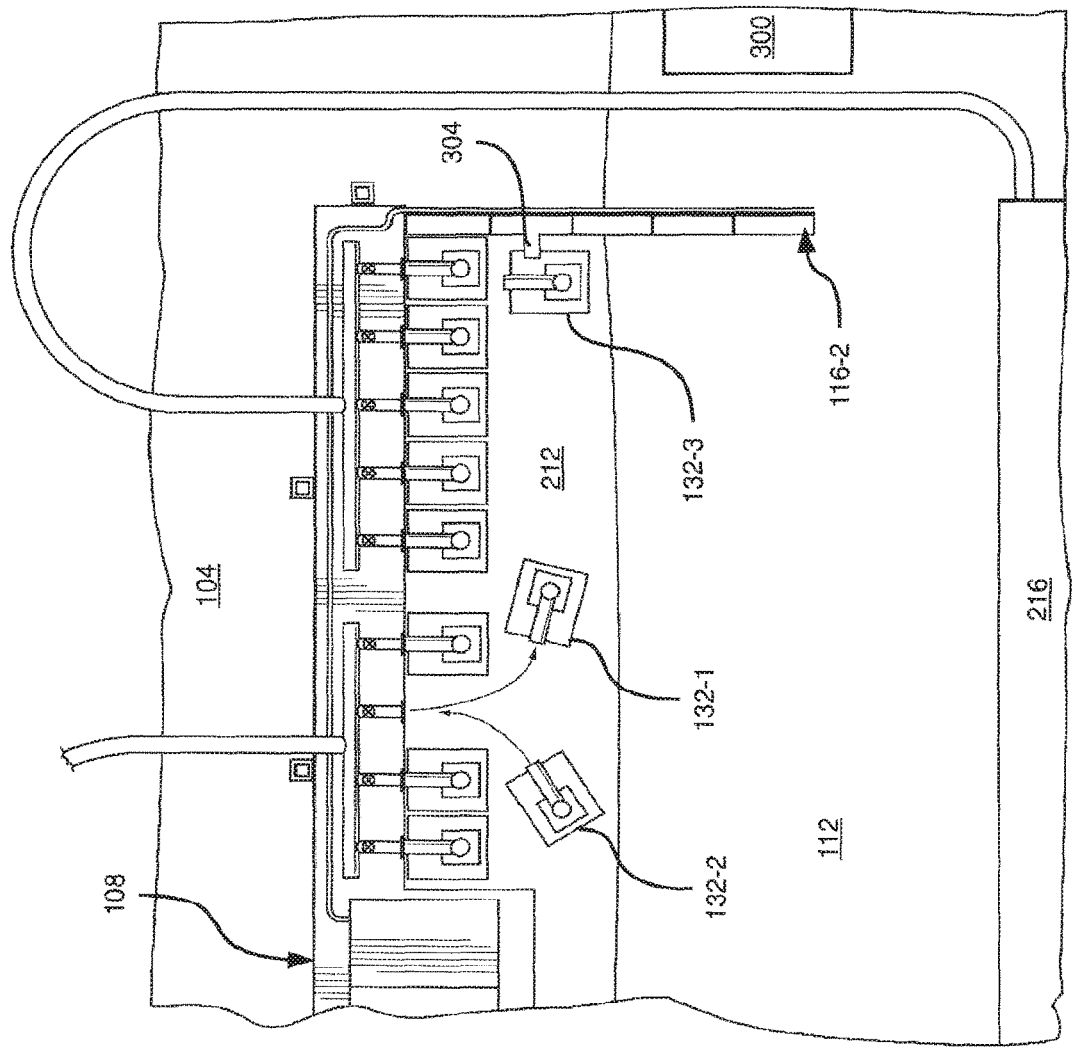
FIG. 3 depicts a partial overhead plan view of the system of FIG. 1, according to a non-limiting embodiment.

Turning now to FIG. 3, a partial overhead view of the pumping system 100 is shown. As will be discussed in greater detail below, each pump barge 132 can be disconnected from the header float 108 independently of the other pump barges 132. Thus, a first pump barge 132-1 is shown having recently been disconnected from the header float 108 and floating within the space 212. A second pump barge 132-2 is positioned within the space 212 to be connected to the header float 108 in place of the pump barge 132-1. Thus, individual pump barges 132 can be removed, added and replaced on the header float 108 without interrupting the operation of the remainder of the pumping system 100. The manipulation of the pump barges 132 within the space 212 can be carried out by a crane 300 provided on the shore 112 in proximity to the space 212. In the present example, the crane 300 is located on the outside walkways 116 at a distance from the pond 104 which allows the crane 300 to reach any particular pump barge 132 connected to the header float 108 or floating within the space 212. In other examples, shore-based winches (not shown) can be used instead of, or in addition to, the crane 300 for manipulating pump barges 132 within the space 212.

As is also shown in FIG. 3, at least one of the walkways 116 can be configured for docking one or more pump barges 132 within the inshore area 212 when the pump barge 132 is disconnected from the header float 108. In particular, a pump barge 132-3 is coupled to a dock 304 of the walkway 116-2 in order to provide access to the pump barge 132-3 from the walkway 116-2, for example to conduct maintenance on the pump barge 132-3.

Figure 4:
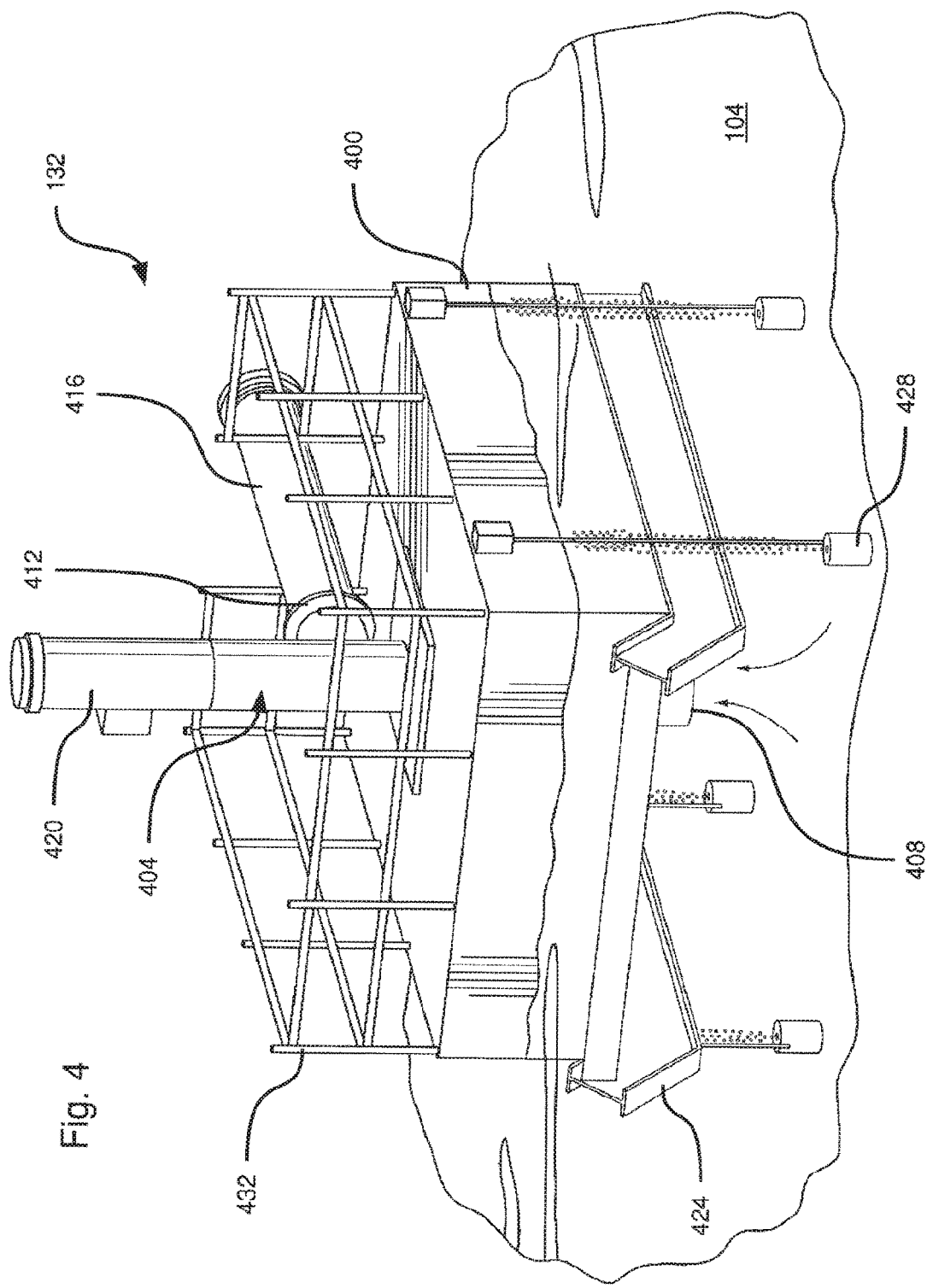
FIG. 4 depicts a pump barge of the system of FIG. 1, according to a non-limiting embodiment.

Referring now to FIG. 4, a pump barge 132 is shown in greater detail. The pump barge 132 can be a pontoon-style barge, and thus includes a pontoon body 400 of any suitable material or combination of materials, including steel and other metals, plastics, composites (such as fibreglass) and the like. In the present example, the pontoon body 400 is dimensioned in order to support the components of the pump barge 132 in the tailings pond 104 while maintaining at least about two feet (0.6 meters) of freeboard. It is contemplated that in other examples, greater or smaller levels of freeboard may be desirable, and the dimensions of the pontoon body 400 may be modified accordingly. The dimensions of body 400 are therefore not particularly limited.

The body 400 of the pump barge 132 supports a pump 404, which can be a vertical turbine pump ("VTP") having an inlet 408 extending downwardly from a lower surface of the body 400 into the pond 104 when the pump barge 132 is deployed. Water from the pond 104 is drawn into the inlet 408 during the operation of the pump 404, and expelled from the pump 404 via an outlet 412, which is connected to a flexible discharge line 416. The pump 404 is removably coupled to a flexible discharge line 416 at the outlet 412 by way of a quick disconnect fitting (for example, fittings such as those manufactured by Victaulic Company). A flexible discharge line 416, in turn, is connected to one of the header pipes 124 (not shown in FIG. 4) when the pump barge is deployed alongside the header float 108. The connection between the discharge line 416 and the header pipe 124 can also be a quick disconnect fitting. Thus, the pump barge 132 can be readily connected to and disconnected from the header float 108.

The pump 404 is driven by a motor 420 which is releasably operably coupled to the pump 404 (that is, coupled to pump 404 in a releasable manner which permits the motor 420 to drive the pump 404). In the present example, the motor 420 is supported by the pump 404 above and substantially coaxially with the pump 404. However, it is contemplated that various arrangements of the pump 404 and the motor 420 can be implemented to accommodate the specifications of the pump 404 and the motor 420. The nature of the motor 420 is not particularly limited. In the present example, the motor 420 is a 250 HP motor with a quick disconnect fitting for connecting to the pump 404.

In operation, the flow rate of the pump 404 can be between about 2500 gallons per minute (gpm) and 6600 gpm in the present example. In other examples, it is contemplated that a wide variety of specifications for the pump 404 and the motor 420 can be selected depending on the particular operating environment of the pumping system 100. Other flow rates are therefore also contemplated.

The pump barge 132 can also include a skid frame 424 (e.g. a steel skid frame) mounted on the lower surface of the body 400 for enabling the pump barge 132 to rest and to move along a surface (e.g. the shore 112 or a transport vehicle, not shown) without damaging the body 400. The term "lower" is used herein to refer to the surface of the body 400 (and more generally, to any surface discussed herein) which, when the pump barge 132 is deployed in the pond 104, it is substantially parallel to the surface of pond 104 and faces towards the bottom of pond 104. The skid frame 424 can be coupled to the body 400 by way of any suitable fasteners or combination of fasteners, including welds, bolts, screws and the like. In other examples, the skid frame 424 can be omitted.

Additionally, the pump barge 132 can include at least one de-icing apparatus. In the present example, each pump barge 132 includes one or more submersible rotary de-icers 428. Each de-icer 428 can be suspended from the body 400, and includes a motor (for example, a 120V, 1 HP motor) driving a propeller (not shown) for circulating water towards the surface of pond 104 in proximity to the body 400 of the pump barge 132. In the present example, four de-icers 428 are suspended from each pump barge body 400, though this number is not particularly limiting—any suitable number of de-icers can be included. In some examples, de-icers can be omitted entirely (for example, in operating environments without the risk of ice formation, or where other de-icing means are provided) or coupled to the header float 108 rather than pump barges 132. The pump barge 132 can also include a safety railing 432. It is also contemplated that the pump barge 132 includes one or more electrical connections (not shown) for receiving power from the electrical house 140 in order to power both the motor 420 and the de-icers 428.

Turning now to FIG. 5, the operation of the pumping system 100 will be discussed in greater detail. The pumping system 100 is shown installed in a fixed position in the tailings pond 104. Thus, the header float 108 is deployed in the pond 104 in proximity to the shore 112 (at a selected first distance from shore 112), and the walkways 116 (of which the walkway 116-2 is visible in FIG. 5) are coupled to the header float 108 and resting partly on the shore 112. As shown in FIG. 5, the sections 120 of the walkway 116-2 are articulated such that a first section 120 coupled to the header float 108 floats in the pond 104 substantially parallel to the surface of the pond 104, while the remaining sections 120 rest on the shore 112 accommodating the slope of the shore 112 (which, in the present example, may be a slope of about 4:1).

As noted above, the pumping system 100 as shown in FIG. 5 is in a fixed position. That is, the spuds 148 are in the extended, or lowered, position and at least a portion of each spud 148 is embedded within the bed of the tailings pond 104 to fix the header float 108 to the tailings pond bed. The spuds 148, in the present example, are about 75 to 90 feet (22.9 to 27.4 meters) in length, though it is contemplated that other spud lengths may be used to accommodate various tailings ponds 104. The depth to which the spuds 148 penetrate into the bottom of the pond 104 is between 3 feet and 25 feet (1 to 7.5 meters), depending on the nature of the material on the bottom of the pond 104. In general, the harder the material, the smaller the penetration depth of the spuds 148. In the deployed position shown in FIG. 5, the tailings pond 104 is at a first level, indicated as "PL" or "Pond Level". In the present example, PL is about 20 feet (6.1 meters), though it will now be appreciated that this level is provided purely for illustrative purposes.

Figure 6:
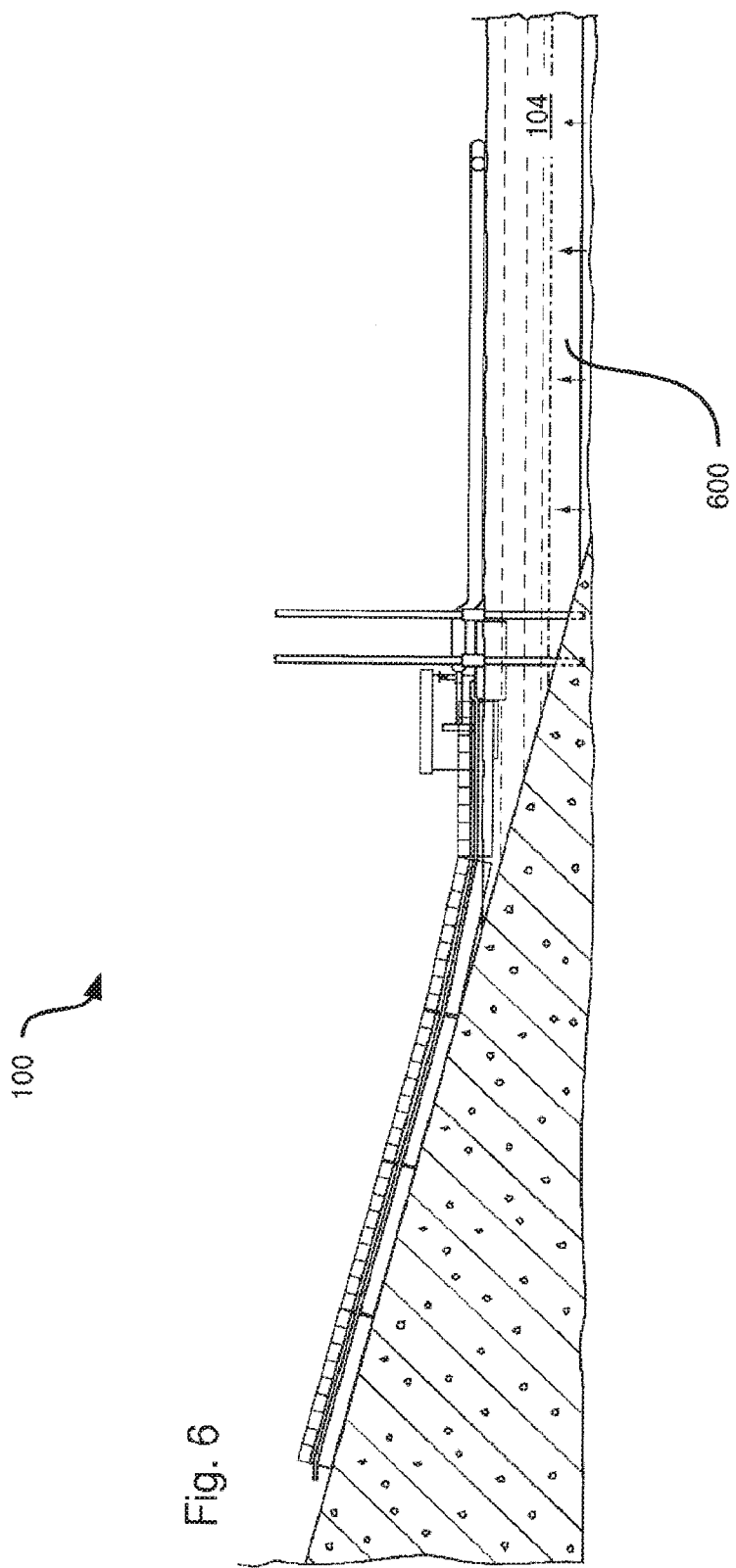
FIGS. 6-8 depict the movement of the system of FIG. 1, according to a non-limiting embodiment.
Figure 7:
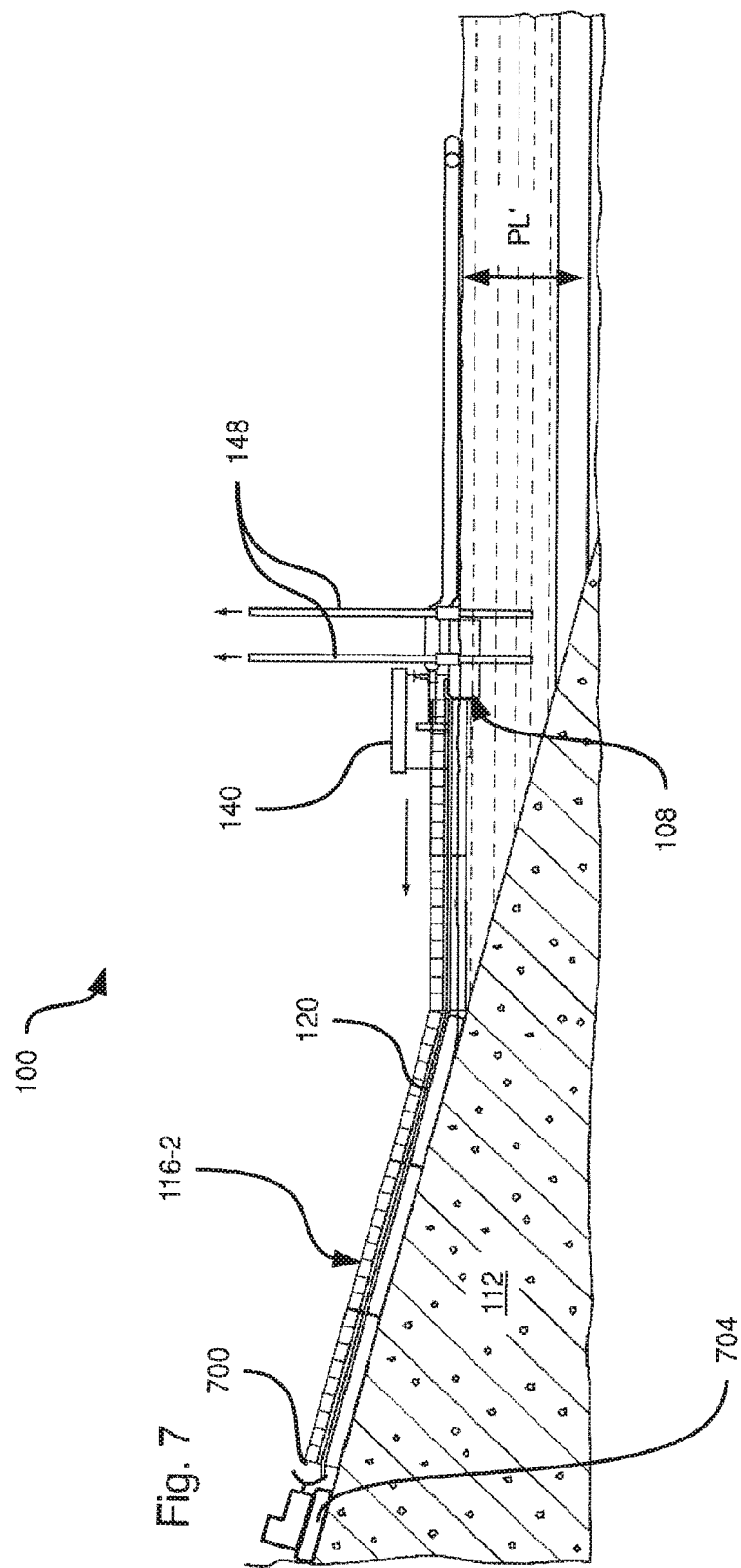

Turning to FIG. 6, over time additional tailings 600 may build up on the bottom of the tailings pond 104. As shown in FIG. 7, the result of such build-up is that the level PL increases over time to level PL'. In the present example, it is assumed that the level PL increases by about 15 feet (4.6 meters) per year, though it is contemplated that a wide variety of rates of increase are possible. Thus, in the present example, the level PL' is greater than the level PL by about 15 feet.

As a result of the increased level of the pond 104, the header float 108 and the pump barges 132 have risen with the surface of the pond 104, and due to the slope of the shore 112, are now located a second distance from that shore 112, which is greater than the first distance shown in FIG. 5. More generally, changes in the geometry of the tailings pond 104 (including, but not limited to, the above-mentioned increase in the level PL) can result in the distance between the header float 108 and the shore 112 exceeding a threshold distance beyond which it is undesirable for the header float 108 to be located. A wide variety of threshold distances are contemplated. For example, the threshold distance can be double the first distance shown in FIG. 5 (which may be the optimal or desired distance between the shore 112 and the header float 108). In order to maintain the distance between the header float 108 and the shore 112, the header float 108 must therefore be moved. This is accomplished by raising or retracting (that is, transitioning to the retracted position), the spuds 148 from the bottom of the pond 104. The spuds 148 can be raised, for example, by winches or by a crane (not shown) mounted on the header float 108, and are shown in FIG. 7 in the raised position.

Following the raising of the spuds 148 to the raised position, the pumping system 100 is moved such that the header float 108 and the pump barges 132 are displaced along the surface of the pond 104. Such a displacement can be accomplished by way of a towing apparatus, such as earth moving equipment (e.g. one or more bulldozers 704), coupled to the onshore end 700 of the walkways 116 in order to pull walkways 116 up the shore 112, thereby pulling the header float 108 and the pump barges 132 along the surface of the pond 104 towards the shore 112. In some examples, the action of the earth moving equipment can supplemented with winches (not shown) mounted to one of the header float 108 and the shore 112 and coupled to the other of the header float 108 and the shore 112.

Figure 8:
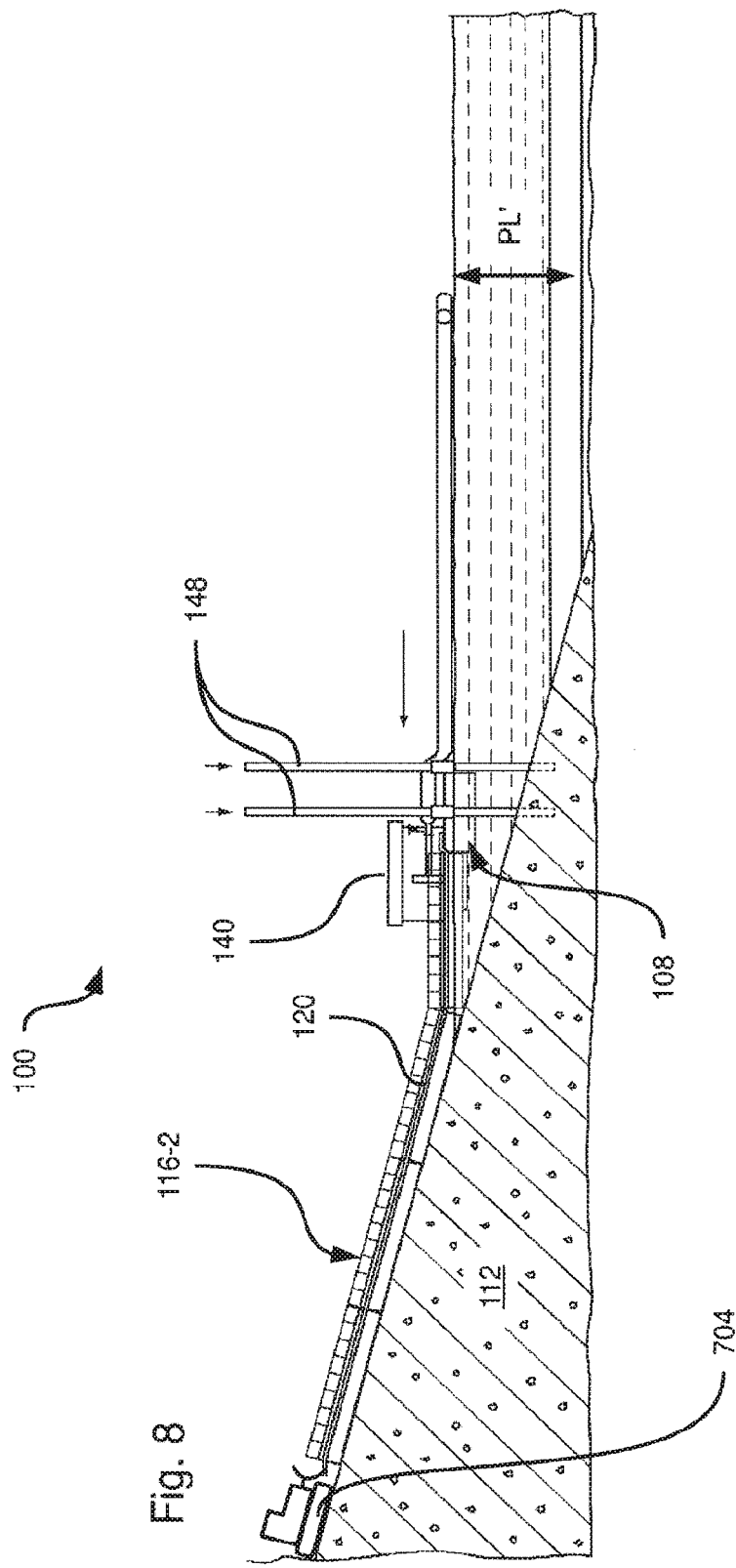

The system 100 is moved as described above until the header float 108 is once again located at the first distance (that is, the distance shown in FIG. 5) from the shore 112 or at least until the header float 108 is located at a distance that is below the threshold distance from the shore 112. The movement and final placement of the pumping system 100 is shown in FIG. 8. Once the movement is completed, the spuds 148 can be released and transitioned to the lowered position, anchoring the header float 108 within the tailings pond 108. In the present example, the lowering of the spuds 148 is accomplished by free-fall, such that the weight of the spuds 148 drives the spuds 148 into the bottom of the tailings pond 104. In other examples, the lowering of the spuds 148 can be controlled, or assisted, by a winch or a crane (not shown).

The above procedure can be repeated as needed, or at scheduled intervals, or a combination of both. For example, the pumping system 100 may be scheduled for moving and fixing in the above-described manner once per year, and may also be moved and fixed on an ad-hoc basis when the level of the tailings pond 104 rises more quickly than anticipated. It is also contemplated that the system 100 can be moved to accommodate decreases in the level PL of the pond 104. In such instances, earth moving equipment can be used to push the walkways 116 down shore 112, thus pushing the header float 108 and the pump barges 132 out into the pond 104. The movement of the system 100 away from the shore 112 may be necessary in response to either or both of decreases in the level PL of the pond 104, and a build up of tailings on the shore 112, which effectively brings the shore 112 closer to the header float 108.

In summary, therefore, also provided herein is a method of relocating a fixed but movable pumping system 100. The method includes raising the spuds 148 from a lowered position to a raised position, thus releasing the header float 108 from the bottom of the tailings pond 104. The method also includes coupling a towing apparatus, including at least one piece of earth moving equipment, to one or more of the walkways 116. The method further includes, following the raising of the spuds 148 and the coupling of the towing apparatus, displacing system 100 along the shore 112 and the surface of the tailings pond 104 using the towing apparatus. The method further includes lowering the spuds 148 to the lowered position, in which the spuds 148 once again anchor the header float 108 within the tailings pond 104. In some examples, the method can also include raising and lowering the spuds 148 without moving the header float 108. Raising and lowering the spuds 148 in place at intervals more frequent than the interval at which the pumping system 100 is moved can reduce the hoisting forces associated with the suction effect when the material of the bottom of the pond 104 is soft.

Figure 9:
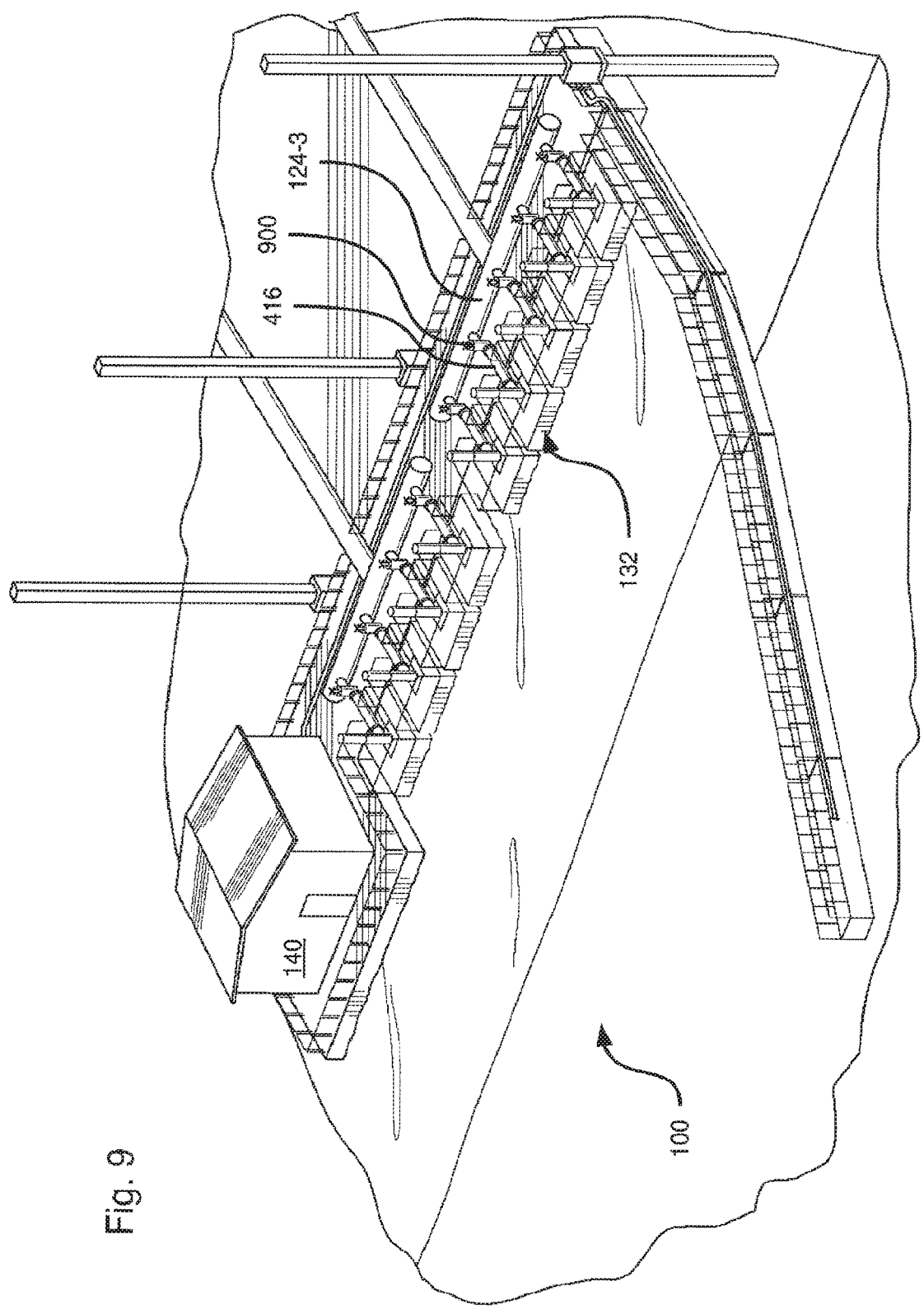
FIG. 9 depicts a partial isometric view of the system of FIG. 1, according to a non-limiting embodiment.

Referring now to FIG. 9, a partial view of the system 100 is provided in which certain components of the system 100 are shown in greater detail. Specifically, the discharge lines 416 of the pump barges 132 are seen as connected to the fittings 900 on the header pipes 124.

Figure 10:
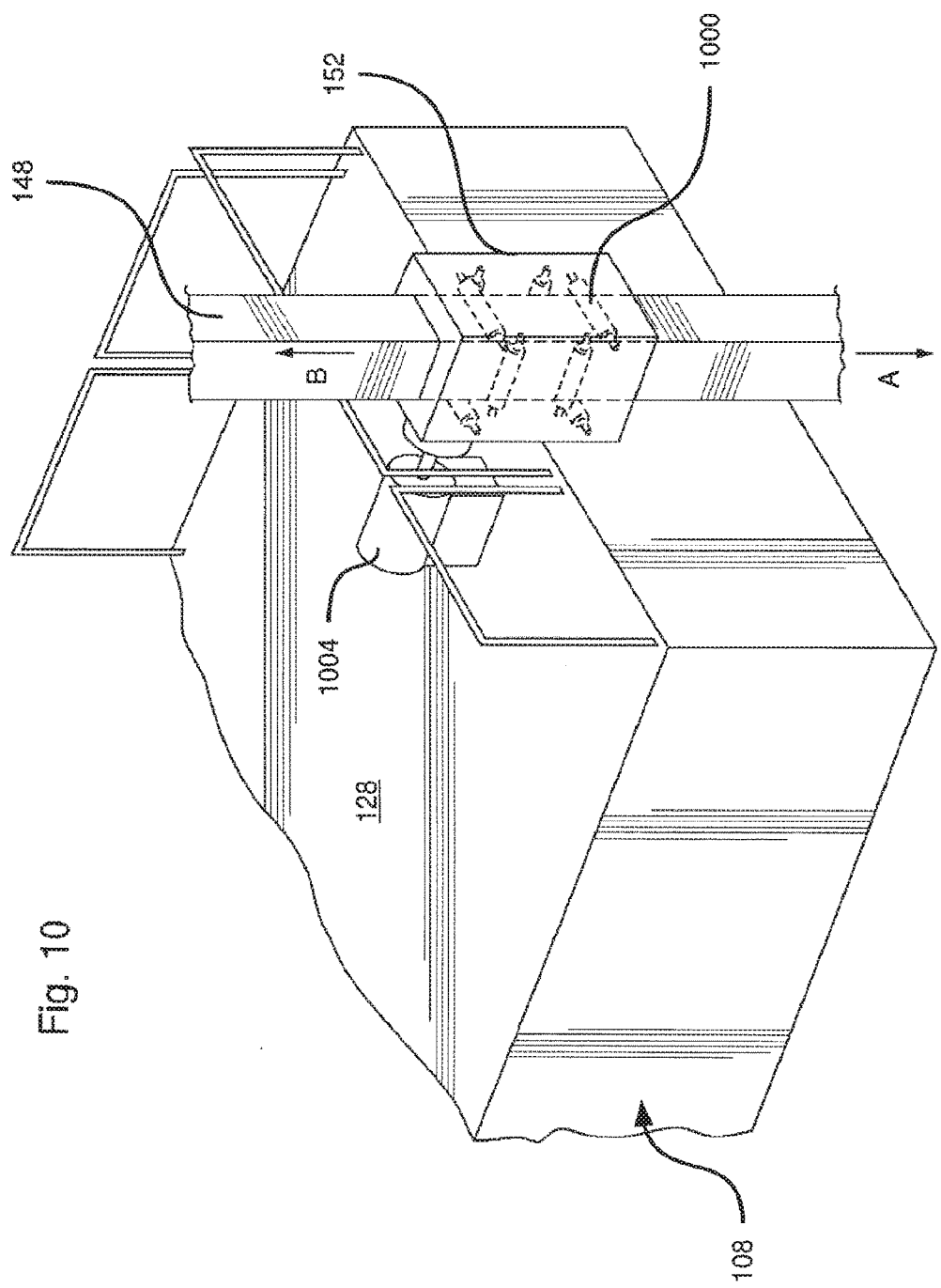
FIG. 10 depicts a spud and spud pocket of the system of FIG. 1, according to a non-limiting embodiment.

Referring to FIG. 10, a detailed view of a spud 148 and a corresponding spud pocket 152 is shown. The spud pocket 152 includes a channel defined therethrough, in which the spud 148 is supported and allowed to slide in opposing directions "A" and "B" between raised and lowered positions. The spud pocket 152 can include one or more rollers 1000 having axes of rotation perpendicular to the directions of travel of the spud 148. The rollers 1000 allow for reduced friction between the spud 148 and the spud pocket 152 during movement of the spud 148. It is also contemplated that when the spuds 148 are in the lowered position (and are therefore fixed, or substantially fixed, to the bottom of the pond 104), rollers 1000 allow the spud pockets, and by association the header float 108, to travel upwards and downwards along the spud 148 to accommodate the rise and fall of the surface of the tailings pond 104. The travelling of the header float 108 along the spuds 148 can precede the situation illustrated in FIG. 7 (e.g. before the level PL has reached the level PL'). In other words, the above-mentioned travelling can accommodate certain variations in the level PL of pond 104 without requiring movement of the pumping system 100. In other examples, rollers 1000 can be omitted and each spud pocket 152 can provide at least one internal bearing surface upon which spud 148 can slide.

The raising of the spuds 148 is accomplished by way of a winch 1004 mounted on an upper surface 128 of the header float 108. The winch 1004 can be coupled to a cable (not shown) which is in turn is coupled to the spud 148, and can thus be used to raise the spud 148. The lowering of the spuds 148 in the present example can be accomplished by disengaging the winch 1004 such that the spud 148 enters free-fall in the direction "A". In other examples, the winch 1004 can be used to moderate the descent of the spud 148, or additional equipment (not shown) can be used to assist the descent of the spud 148. For example, a hydraulic apparatus (such as a hydraulic cylinder, not shown) may be connected to the spud 148 and operated to drive the spud 148 into the bottom of the pond 104. In some examples, such a hydraulic apparatus may replace the winch 1004; that is, the winch 1004 may be omitted entirely, and the hydraulic apparatus may be used to both raise and lower the spud 148.

Certain advantages will now be apparent to those skilled in the art from the above description. For example, the coupling of the walkways 116 near the ends 208 of the header float 108, and the coupling of pump barges 132 along the inshore side 204 of the header float 108, allow the pump barges 132 to be protected from heavy wind, waves, and moving ice, while also allowing for easy access to the pump barges 132 from shore (via crane 300, for example) for maintenance purposes. Ready access to the pump barges 132 from the shore 112 allows maintenance and replacement of the pump barges 132 at the header float 108 to be carried out rapidly, reducing the pump downtime.

Another exemplary advantage provided by the pumping system 100 as described above is that the construction (and eventual re-construction, in response to increases or decreases of the level PL of the pond 104) of concrete piles on shore 112 and in the tailings pond 104 in order to anchor the pumping system 100 can be avoided.

A further exemplary advantage provided by the pumping system 100 is that individual pump barges 132 can be replaced, removed and added to the pumping system 100 as necessary, without affecting the remaining pump barges. Thus, the overall performance of the pumping system 100 (for example, measured in terms of pumping capacity) can remain substantially consistent despite changes to the system 100, such as the replacement of some pump barges 132. An additional exemplary advantage provided by the system 100 is that the pump barges 132 may remain operational during the relocation of the pumping system 100, further reducing downtime. Other advantages may also occur to those skilled in the art.

Variations to the pumping system 100 as described above are also contemplated. For example, in some variations, an electrical house 140 can be omitted from the header float 108. In such examples, the electrical house 140 can instead be located on the shore 112.

In other example variations of the pumping system 100, three or more walkways 116 may be provided, for example when the header float 108 exceeds a certain length in order to allow to ready access to all portions of the header float 108 from the shore 112. In further variations, the walkways 116 can be omitted entirely.

Figure 11:
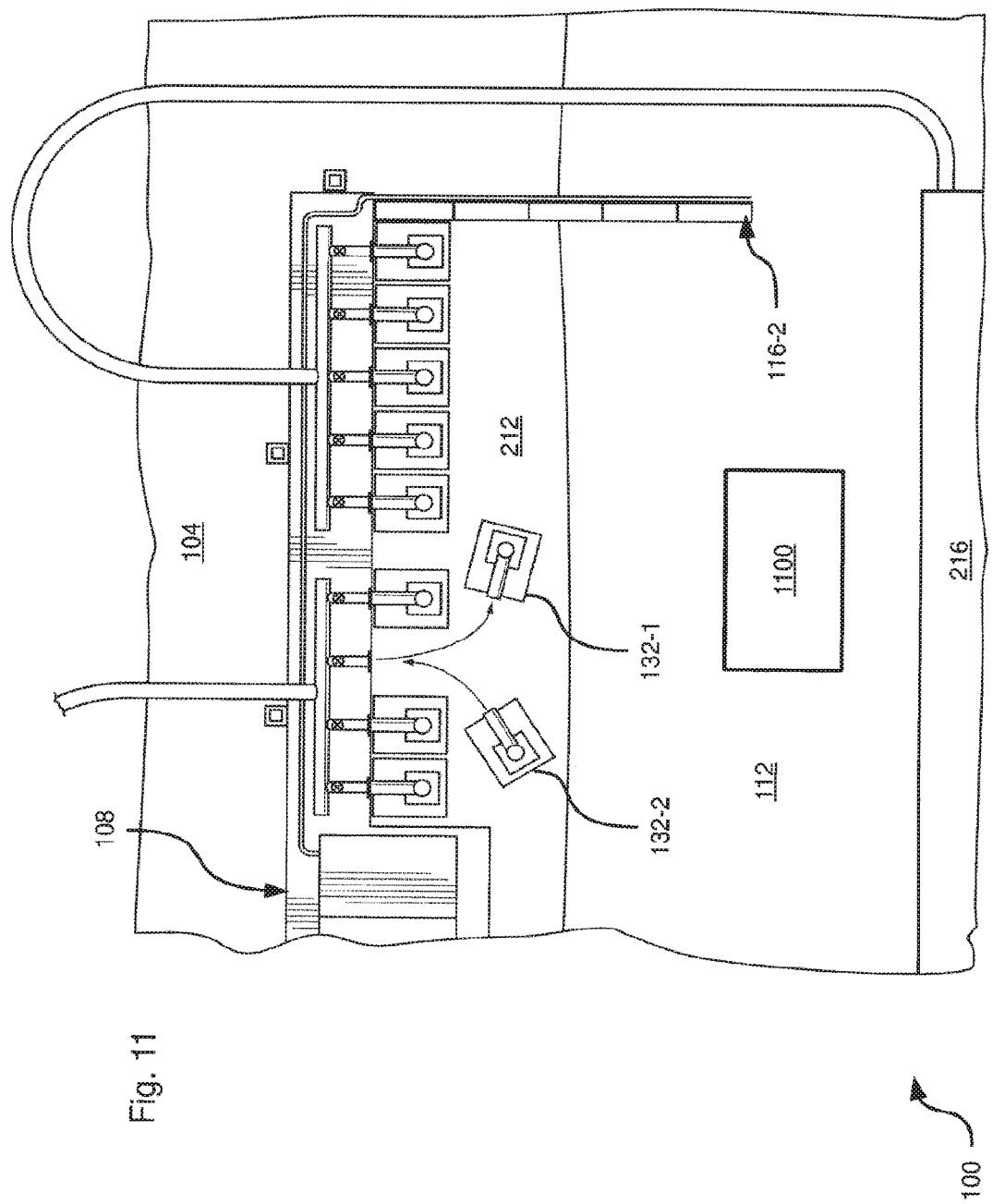
FIG. 11 depicts a partial overhead plan view of the system of FIG. 1, according to another non-limiting embodiment.

In additional variations, as shown in FIG. 11, the dock 304 can be omitted from walkways 116. Further, an onshore crane 1100 can be provided between the walkways 116, rather than the crane 300 which was provided outside of the walkways 116.

In further variations, the header pipes 124 can be omitted from the header float 108 and instead be provided on the shore 112. In such variations, the discharge lines 416 from the pump barges 132 can extend to the shore 112 before connecting to the header pipes 124.

In still further variations, the pump support of the pumping system 100 can be a single barge rather than the header float 108 and the pump barges 132. In these variations, such a monolithic barge can support an electrical house such as the electrical house 140, as well as a pump house which contains at least one pump mounted to the monolithic barge. The walkways 116, header pipes 124, spuds 148, de-icers 428 and the like can be connected to the monolithic barge or omitted, as described above.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described above in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

We claim:

1. A pumping system for use in a body of fluid, comprising:
   a single rigid header float supporting a header pipe, the single rigid header float having:
      an inshore edge and an offshore edge defining a length of the single rigid header float substantially parallel to a segment of a shore of the body of fluid;
      respective end edges separating the inshore edge from the offshore edge and defining a width of the single rigid header float that is smaller than the length;
   first and second floating walkways coupled to the single rigid header float adjacent to respective ones of the end edges and substantially perpendicularly to the length;
   the first and second floating walkways extending toward the segment of the shore to define an inshore area bounded by the segment of the shore, the inshore edge, and the first and second walkways;
   a plurality of pump barges each coupled to the inshore edge of the single rigid header float within the inshore area;
   a plurality of pumps each mounted on respective ones of the pump barges, each pump having an outlet connected to the header pipe.

2. The system of claim 1, further comprising a mooring element on the single rigid header float, the mooring element having an extended position for fixing the single rigid header float to a bed of the body of fluid, and a retracted position for permitting movement of the single rigid header float relative to the bed.

3. The system of claim 2 wherein the mooring element comprises a spud slidably supported by a spud pocket coupled to the single rigid header float.

4. The system of claim 3 wherein the spud pocket is coupled to the offshore edge of the single rigid header float.

5. The system of claim 2, further comprising a moving apparatus for transitioning the mooring element between the extended and retracted positions.

6. The system of claim 1 wherein each of the first and second floating walkway comprises a flexible floating walkway comprising a plurality of flexibly coupled walkway sections.

7. The system of claim 1 wherein an onshore end of each of the first and second floating walkways is configured to connect to a towing apparatus.

8. The system of claim 1 wherein no pump barges are coupled to the offshore edge of the single rigid header float.

9. The system of claim 1, further comprising respective discharge lines connecting each pump to the header pipe.

10. The system of claim 1 wherein each of the pump barges are releasable from the single rigid header float.

11. The system of claim 10 wherein at least one of the first and second floating walkways is configured for docking a disconnected one of the plurality of pump barges within the inshore area when the disconnected pump barge is released from the single rigid header float.

12. A header float assembly for a pumping system for use in a body of fluid, comprising:
   a single rigid header float supporting a header pipe, the single rigid header float having:
      an inshore edge and an offshore edge defining a length of the single rigid header float substantially parallel to a segment of a shore of the body of fluid;
      respective end edges separating the inshore edge from the offshore edge and defining a width of the single rigid header float that is smaller than the length;
   first and second floating walkways coupled to the single rigid header float adjacent to respective ones of the end edges and substantially perpendicularly to the length;
   the first and second floating walkways extending toward the segment of the shore to define an inshore area bounded by the segment of the shore, the inshore edge, and the first and second walkways;
   wherein the header pipe includes a plurality of inlets facing the inshore area for connection to respective pumps supported on pump barges.

13. The header float assembly of claim 12, further comprising a mooring element on the single rigid header float, the mooring element having an extended position for fixing the single rigid header float to a bed of the body of fluid, and a retracted position for permitting movement of the single rigid header float relative to the bed.

14. The header float assembly of claim 13 wherein the mooring element comprises a spud slidably supported by a spud pocket coupled to the single rigid header float.

15. The header float assembly of claim 14 wherein the spud pocket is coupled to the offshore edge of the single rigid header float.

16. The header float assembly of claim 12 wherein each of the first and second floating walkway comprises a flexible floating walkway comprising a plurality of flexibly coupled walkway sections.

17. The header float assembly of claim 12 wherein an onshore end of each of the first and second floating walkways is configured to connect to a towing apparatus.

18. The header float assembly of claim 12 wherein no pump barges are coupled to the offshore edge of the single rigid header float.

19. The header float assembly of claim 12, further comprising respective discharge lines connecting each pump to the header pipe.

20. A method, comprising:
   deploying, in a body of fluid, a single rigid header float supporting a header pipe, the single rigid header float having:
      an inshore edge and an offshore edge defining a length of the single rigid header float substantially parallel to a segment of a shore of the body of fluid;
      respective end edges separating the inshore edge from the offshore edge and defining a width of the single rigid header float that is smaller than the length; and
      a mooring element having an extended position for fixing the single rigid header float to a bed of the body of fluid, and a retracted position for permitting movement of the single rigid header float relative to the bed;
   connecting first and second floating walkways to the single rigid header float adjacent to respective ones of the end edges and substantially perpendicularly to the length, such that the first and second floating walkways extend toward the segment of the shore to define an inshore area bounded by the segment of the shore, the inshore edge, and the first and second walkways;
   connecting a plurality of pump barges each coupled to the inshore edge of the single rigid header float within the inshore area; and
   transitioning the mooring element between the retracted and extended positions to permit and prevent, respectively, movement of the single rigid header float relative to a bed of the body of fluid.

\* \* \* \* \*